(12) United States Patent
Nilsen et al.

(10) Patent No.: US 9,382,142 B2
(45) Date of Patent: Jul. 5, 2016

(54) APPARATUS AND METHOD FOR BALLAST WATER TREATMENT

(76) Inventors: Halvor Nilsen, Stavanger (NO); Birgir Nilsen, Stamford, CT (US)

( * ) Notice: Subject to any disclaimer, the term of this patent is extended or adjusted under 35 U.S.C. 154(b) by 878 days.

(21) Appl. No.: 12/734,867

(22) PCT Filed: Dec. 4, 2007

(86) PCT No.: PCT/US2007/024848
§ 371 (c)(1),
(2), (4) Date: May 27, 2010

(87) PCT Pub. No.: WO2009/073003
PCT Pub. Date: Jun. 11, 2009

(65) Prior Publication Data
US 2010/0300982 A1    Dec. 2, 2010

(51) Int. Cl.
*C02F 1/32* (2006.01)
*C02F 1/72* (2006.01)
*B63J 4/00* (2006.01)
*C02F 1/00* (2006.01)
*C02F 103/00* (2006.01)

(52) U.S. Cl.
CPC .................. *C02F 1/725* (2013.01); *B63J 4/002* (2013.01); *B63J 4/004* (2013.01); *C02F 1/325* (2013.01); *C02F 1/001* (2013.01); *C02F 2103/008* (2013.01); *C02F 2201/3223* (2013.01); *C02F 2305/10* (2013.01)

(58) Field of Classification Search
CPC .................. C02F 1/32; C02F 2201/328; C02F 2201/3227; C02F 2201/324; B01D 35/06
USPC .............. 422/21, 24, 27, 32, 129, 186, 186.3; 210/198.1, 748.01, 748.11, 748.13, 210/748.18, 767, 739, 153, 167.19, 348; 250/324, 200, 432 R, 435, 436
See application file for complete search history.

(56) References Cited

U.S. PATENT DOCUMENTS

| | | | |
|---|---|---|---|
| 3,728,106 A * | 4/1973 | Badia et al. | 420/486 |
| 5,482,629 A * | 1/1996 | Rippetoe et al. | 210/448 |
| 6,106,787 A * | 8/2000 | Rippetoe et al. | 422/186.04 |
| 6,267,883 B1 * | 7/2001 | Weaver et al. | 210/198.1 |
| 7,166,230 B2 * | 1/2007 | Nilsen et al. | 210/739 |
| 7,354,175 B2 * | 4/2008 | Culbert et al. | 362/263 |
| 2005/0040028 A1 * | 2/2005 | Hebert et al. | 204/157.15 |
| 2005/0040091 A1 * | 2/2005 | Nilsen et al. | 210/198.1 |
| 2008/0203004 A1 * | 8/2008 | Abe et al. | 210/205 |
| 2008/0258080 A1 * | 10/2008 | Rippe Toe | 250/492.1 |

FOREIGN PATENT DOCUMENTS

WO    WO 2007052763 A1 *  5/2007

* cited by examiner

*Primary Examiner* — Walter D Griffin
*Assistant Examiner* — Cameron J Allen
(74) *Attorney, Agent, or Firm* — Patrick J. Walsh

(57) ABSTRACT

An apparatus and method for treating ballast water to achieve IMO standards for ballast water includes a reactor fabricated of copper nickel for receiving and discharging ballast water, a UV source for irradiating the water in the presence of copper nickel thereby to generate free radicals for biocidal and bactericidal effects on organisms and microbes entering the reactor with ballast water.

1 Claim, 1 Drawing Sheet

APPARATUS AND METHOD FOR BALLAST WATER TREATMENT

FIELD OF THE INVENTION

The invention relates to ballast water treatment by removal of solid particles and organisms by means filtration, and by application of biocidal and bactericidal effects to achieve standards established in the International Convention for the Control and Management of Ships' Ballast Water and Sediments, 2004 and being carried out by the International Maritime Organization for merchant vessels (The IMO Convention).

BACKGROUND OF THE INVENTION

The Convention establishes standards and regulations for discharge of ballast water and sediments from ships so as to control the discharge of harmful aquatic organisms and pathogens causing injury to the environment, human health, property and resources. The Convention specifically takes note of the objectives of the 1992 Convention on Biological Diversity as to the conservation and sustainable use of biological diversity and marine coastal ecosystems, and to the threat posed by alien species to these ecosystems, as well as to habitats and species.

The Convention standards for ballast water treatment including Regulation D-2 Ballast Water Performance Standard are:

1 Ships conducting Ballast Water Management in accordance with this regulation shall discharge less than 10 viable organisms per cubic metre greater than or equal to 50 micrometres in minimum dimension and less than 10 viable organisms per milliliter less than 50 micrometres in minimum dimension and greater than or equal to 10 micrometres in minimum dimension; and discharge of the indicator microbes shall not exceed the specified concentrations described in para2graph 2.

2 Indicator microbes, as a human health standard, shall include:

.1 Toxicogenic *Vibrio cholerae* (O1 and O139) with less than 1 colony forming unit (cfu) per 100 milliliters or less than 1 cfu per 1 gram (wet weight) zooplankton samples;

.2 *Escherichia coli* less than 250 cfu per 100 milliliters;

.3 Intestinal Enterococci less than 100 cfu per 100 milliliters.

Viable organisms of Reg. D-2(1) greater than or equal to 50 micrometres in minimum dimension are removed from ballast water to a level of less than 10 viable organisms per cubic meter by means of commercially available filtration devices equipped with 40 micron filtering screens.

Ballast water discharged from a commercially available 40 micron filter device requires further treatment for (i) the removal of organisms less than 50 micrometres in minimum dimension and greater than or equal to 10 micrometres in minimum dimension to a level of less than 10 viable organisms per millilitre, and (ii) removal of indicator microbes to the levels recited in Reg. D-2(2) above.

In the art of purifying water, ultraviolet light is well known as having a biocidal and bactericidal effect on organisms and microbes and is often used with ozone, photo-catalysts, and other substances to achieve a desired effect on organisms.

U.S. Pat. No. 5,322,569 to Titus prevents biofouling of underwater objects by ultraviolet irradiation. Marine biofouling is avoided by irradiation of specific surfaces of under water objects with ultraviolet light to prevent attachment of organisms to those surfaces, to stun the organisms prior to removal, or to exterminate organisms at specific surfaces or over a defined volume. Titus employs ultraviolet light having a wavelength of $250.+-.10$ nanometers and providing a minimum irradiation intensity of $20.\mu.watt/cm.sup.2$ at a distance of at least two feet. Conventional ultraviolet light sources such as mercury, mercury/xenon, and xenon lamps have been found to provide satisfactory ultraviolet power output.

U.S. Pat. No. 6,358,478 to Söremark is directed to the treatment of fluids and generates ozone for its oxidizing effect. UV radiation at a frequency of 180 nm is known to generate ozone which by exposure to the radiation is broken down to obtain free radicals. A combination of ozone, oxygen, hydroperoxide and UV radiation provides quick and efficient generation of free radicals. Microorganisms are inactivated with the aid of ozone and radicals as an oxidation reaction. The membrane of the organism is first attacked by radicals, and thereafter radicals destroy nuclear material inside the cell/virus/spore.

U.S. Pat. No. 6,092,653 to Carmignani is directed to purification and disinfection of fluids using semiconductor photocatalysts notably titanium dioxide and ultraviolet radiation in a device where fluid to be purified has intimate contact with semiconductor surfaces while spreading activating UV light over as large a surface area as is practical.

U.S. Pat. No. 7,081,636 to Morazzi discloses that it is known to use ultraviolet (UV) radiation in sterilisation systems for use in the purification of water and the sanitisation of a variety of items. The UV radiation and any ozone produced by the UV radiation with oxygen in the air acts to kill bacteria and germs. It is also known to use ultraviolet (UV) radiation for a variety of other uses including those involving the promotion of photochemical reactions and of molecular dissociation. One problem such systems is that it is difficult to efficiently provide sufficient excitation energy to the UV source and difficult to effectively transfer that energy to the substance or entity to be treated. It is therefore difficult to arrange systems for high energy, high throughput industrial purposes. Accordingly, Morazzi provides an ultraviolet light source comprising an ultraviolet bulb; a pulsed microwave energy source for exciting said ultraviolet bulb; and an optically transparent waveguide for guiding pulsed microwave energy originating from said pulsed microwave energy source to the ultraviolet bulb. The waveguide wholly surrounds the ultraviolet bulb. In one aspect, the dominant wavelength of the ultraviolet light source is from 240 nm to 310 nm, particularly 254 nm. Such wavelengths have been found to be particularly useful for sterilisation, purification or sanitisation applications.

So, while UV irradiation is known for killing organisms, it is nonetheless necessary to utilize UV radiation in a specific system in order to achieve desired purification effects in fluids.

Applicants in this invention provide a method and apparatus using ultraviolet radiation with specific reference to reducing organisms and microbes in treatment of ships ballast water.

SUMMARY OF THE INVENTION

This invention is directed to an apparatus and method for ballast water treatment in applying a biocidal and bactericidal effect using ultraviolet light on organisms and microbes remaining in ballast water after filtration of larger organisms such that the treatment achieves the standards of Regulation D-2.

This invention provides an enclosed reactor for receiving ballast water and for applying radiation to biota and bacteria carried in the ballast water. A medium pressure UV source extending through the reactor irradiates ballast water flow with a dwell time of less than one second in the reactor. Ballast water flow through a single reactor is about 165 m³/hr and a plurality of reactors arranged for parallel flow can achieve a total flow sufficient for full ballast water capacity of merchant ships or any other seagoing or coastwise vessel.

A reactor according to the invention comprises a generally cylindrical shell defining a reaction chamber enclosed at both ends with end caps. A quartz tube encasing an ultraviolet lamp and supported at opposite ends at the end caps extends along the central axis of the reactor shell for emitting UV radiation within the shell chamber. The reactor is further fitted with ballast water inlet and outlet pipes preferably providing tangential entry and exit of ballast water at opposite ends of the shell, and preferably on opposite sides of the shell. In a significant aspect of the invention, applicants have discovered that unexpected, consistent, and repeatable biocide and bactericidal effects are achieved in fabricating the reactor shell of copper nickel alloy.

Applicants believe that a copper nickel reactor shell in cooperation with an ultraviolet source generates free radicals in the ballast water being treated so as to have a significant biocidal and bactericidal effect on organisms and microbes. Equivalent reactor tests using a stainless steel shell repeatedly failed both to achieve the effects attained with a copper nickel shell, and to meet the standards of Reg D-2.

It is an objective of the invention to provide a method and apparatus for ballast water treatment achieving IMO Convention standards set by Reg. D-2.

It is an objective of the invention to provide a method and apparatus for applying biocidal and bactericidal effects on ballast water utilizing ultraviolet light in a reactor shell fabricated of copper nickel.

It is an object of the invention to provide a reactor for shipboard ballast water treatment having a capacity of 165 m³ per hour per reactor, and to provide installation of multiple reactors for treating full ballast water capacity of any marine vessel.

Other objectives, advantages and preferred features of the invention will become apparent with an understanding of the following detailed description of preferred embodiments the invention or upon employment of the invention in practice.

BRIEF DESCRIPTION OF THE DRAWING

A preferred embodiment of the invention has been chosen for detailed description to enable those having ordinary skill in the art to which the invention appertains to readily understand how to practice the invention and is shown in the accompanying drawing in which.

DETAILED DESCRIPTION OF THE PREFERRED EMBODIMENT

Figure 1:
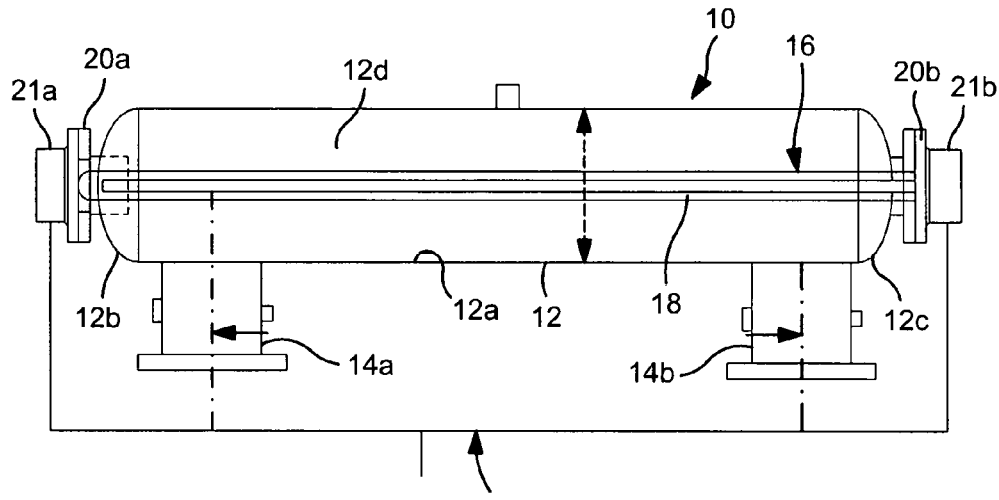
FIG. 1 is a side elevation schematic view of a reactor apparatus of the invention.

Referring to the drawing, the apparatus 10 according to the invention comprises a reactor 12 in the preferred form of a cylindrical shell 12a fitted with end caps 12b-c to define a reaction chamber 12d for receiving and treating ballast water. Inlet and outlet connection pipes 14a-b are fitted 90° to the reactor body at opposite ends, and preferably on opposite sides of the shell, for tangential ballast water flow into and out of the reactor. The working pressure of the reactor is from 10 to 15 bars with a pressure drop through the reactor of less than 60 mbar. Shipboard pressure of ballast water flowing through the reactor is about 2 bars. The reactor is designed for horizontal installation and has a diameter of 150 mm to 300 mm, and a length of about 1700 mm (1.7 meter) inclusive of fittings supported by the end caps.

A medium pressure ultraviolet lamp 16 is fitted into a quartz tube 18 and extends along the central axis of the reactor from end fitting 20a to end fitting 20b for emitting ultraviolet radiation for biocidal and bactericidal effects on organisms and microbes entrained in ballast water treated by the reactor. The lamp is rated at 35 kW, emits uv radiation at 254 nm at 22% efficiency, i.e., producing 22 kW of uv radiation per 100 kW power input. Normal power input for the UV lamp is 35 kw.

The quartz tube 18 is optically transparent, extends along the central axis of the reactor from end fitting to end fitting, takes a test pressure of 15 bars, and withstands shaking and vibration of the vessel. The UV lamp does not produce ozone, other oxidants or chemicals.

Test water specified by IMO for certification tests of ballast water treatment equipment has typically a UV transmission of 40% at T1 (i.e., 1 cm), or absorbance of 0.4 Abs/cm. Ballast water treatment apparatus of the present invention subjected to IMO certification tests using this very low quality test water had the desired biocidal and bactericidal effects.

Power input required per reactor is 400v, 3 ph, 38 kW at 80 A and is provided to the uv lamp from a power panel and control panel (not shown), through a lamp cable 19 via junction boxes 21a-b mounted on end cap flanges. The power panel converts the inlet power to the power required by the UV lamp and maintains a balanced burning of the lamp to provide the maximum UVC output. It is to be understood that power input voltage is determined by each ship service electric system, typically 400v, and that the present invention may be used with ship service electric systems having voltage ratings of 380v to 440v.

In a significant aspect of the invention, applicants have determined that unexpected, consistent, and repeatable biocide and bactericidal effects are achieved in fabricating the reactor shell 12 of copper nickel alloy, specifically copper nickel 90/10 alloy. Performance tests carried out using a given uv lamp in a 200 mm diameter reactor shell fabricated of stainless steel failed to meet the standards set by Reg D-2. Performance tests carried out using the given uv lamp in a 300 mm diameter reactor shell fabricated of 90/10 copper nickel, provided superior biocidal and bactericidal effects than those attained with the 200 mm stainless steel shell. Performance tests using the same lamp with a 150 mm diameter 90/10 copper nickel shell yielded test results meeting the Reg D-2 standards both as to organisms and microbes.

As noted above, the uv source does not produce ozone. So, applicants believe that a copper nickel reactor shell acts as a catalyst in cooperation with an ultraviolet source to generate free radicals (and/or copper ions) in the ballast water being treated so as to have a significant biocidal and bactericidal effect on organisms and microbes. It is known that a significant portion of the toxicity of copper comes from its ability to accept and donate single electrons as it changes oxidation state. This ability catalyses the production of very reactive radical ions such as hydroxyl radical. Swiss K W Nägeli in 1893 discovered the toxic effect of metal ions on living cells, algae, molds, spores, fungi, virus and microorganisms even in low concentrations. This anti-microboial effect is shown by ions of mercury, silver, copper, iron, lead, zinc, bismuth, gold, aluminum and other metals. Applicants believe that hydroxyl radicals are created by uv radiation in the presence of copper nickel, are very short-lived, and are very hostile to organisms and microbes present in ballast water.

Tests according to IMO specifications were carried out for a reactor according to the present invention fabricated of a copper nickel shell with a uv lamp emitting radiation at 254 nm. Test influent water had moderate salinity, and was stocked with a >50 μm group of harvested organisms and cultured species, a 10-50 μm group of organisms and with heterotropic bacteria all in the quantities of table 1, below.

TABLE 1

| Organism group | Influent water | In treated water after 5 days storage | In control after 5 days storage |
|---|---|---|---|
| 50 μm min. dimension | Pref. $10^6$ $m^{-3}$, $10^5$ $m^{-3}$ Min. 5 species from 3 diff. phyla/divisions | <10 viable organisms per $m^3$ | >10x <10 viable organisms per $m^3$ |
| 10-50 μm min. dimension | $10^4$ $ml^{-1}$, $10^3$ $ml^{-1}$ Min. 5 species from 3 diff. phyla/divisions | <10 viable organisms per $m^3$ | >10x <10 viable organisms per $m^3$ |
| Heterotrophic bacteria | $10^4$ $ml^{-1}$ | — | — |
| Vibrio sp./ Vibrio cholerae (O1-O159) * | — | <1 cfu/100 ml | 10x <1 cfu/100 ml |
| Escherichia coli | — | <250 cfu/100 ml | 10x <250 cfu/100 ml |
| Intestinal Enterococci | — | <100 cfu/100 ml | 10x <100 cfu/100 ml |

Influent water to meet IMO specification has between $10^5$ and $10^6$ viable organisms >50 μm in minimum dimension to be reduced to <10 viable organisms per $m^3$ after being subjected to ballast water treatment including filtration, and to remain at the reduced level in storage five days later. As noted above, these organisms are removed in large measure by means of a 40 μm filter screen apparatus. Organisms in this group size that nonetheless pass through a 40 μm filter screen are to be reduced to <10 viable organisms per $m^3$ as indicated.

Influent water to meet IMO specification has between $10^3$ and $10^4$ viable organisms 10-50 μm in minimum dimension per microliter to be reduced to <10 viable organisms per $m^3$ after being subjected to ballast water treatment, and to remain at the reduced level in storage five days later.

Heterotrophic bacteria for IMO specification has $10^4$ microliter to be reduced to <1 colony forming unit/100 milliliter and to remain at the reduced level in storage five days later.

Table 2 sets forth the initial content of organisms within the defined test organism groups in the influent test water introduced into the reactor according to the invention for ballast water treatment.

TABLE 2

| Test organism | Method | Influent | Requirement |
|---|---|---|---|
| Organisms ≥50 μm | Microscope counts | $4.2 \pm 0.7 \times 10^4$ $m^3$ | $10^5$ $m^{-3}$ |
|  | Phyla | 5 | 3 different |
|  | Species | 6 | 5 different |
| Organisms 10-50 μm | Dilution method | 5000 | 1000 $ml^{-1}$ |
|  | 95% conf. Interval | 2000-20000 |  |
|  | Microscope counts | 1781 ± 196 |  |
|  | Plate counts | 1066 |  |
|  | Phyla | 3 | 3 different |
|  | Species | 8 | 5 different |
| Hetero. bact. | Bacterial counts | $6.6 \pm 2.1 \times 10^5$ $ml^{-1}$ | $10^4$ $ml^{-1}$ |
| Coliform bacteria | Bacterial counts | $>8 \pm - \times 10^2$/100 ml | — |
| Vibrio sp. | Bacterial counts | $1.6 \pm 1.2 \times 10^3$/100 ml | — |
| Vibrio cholerae | Bacterial counts, elimination method | — | — |
| Enterococcus group | Bacterial counts | $>8 \pm - \times 10^3$/100 ml | — |

Table 3 indicates that, for viable organisms 50 μm in minimum diameter in treated test water and control water immediately after treatment and after five days of storage, the required level of Reg D-2 was fulfilled

TABLE 3

|  | Treated water | | Control water | |
| --- | --- | --- | --- | --- |
|  | Day 0 | Day 5 | Day 0 | Day 5 |
| Organisms ≥50 μm in minimum diameter (individuals/m³) | | | | |
| Requirement | — | <10 | — | >100 |
| Test 1 | $0 \pm 0$ |  | $8.4 \pm 0.8 \times 10^4$ | $7.4 \pm 2.8 \times 10^4$ |
| Test 1 Pre |  | 0 |  |  |
| Test 1 Post |  | $1 \pm 1$ |  |  |

Table 4 indicates that, for viable organisms ≥10-50 μm in minimum dimension in treated test water and control water immediately after treatment and after five days of storage, the required level of Reg D-2 was fulfilled.

TABLE 4

|  | Treated water | | Control water | |
| --- | --- | --- | --- | --- |
|  | Day 0 | Day 5 | Day 0 | Day 5 |
| Organisms ≥10-50 μm in minimum diameter (individuals/ml) | | | | |
| Requirement | — | <10 | — | >100 |
|  |  | Dilution method | | |
|  |  | 95% confidence interval | | |
| Test 1 | 160 | <0.2 | 3000 | 5000 |
|  | 60-530 | <0.1-1.0 |  |  |
| Test 2 | 50 | 0.4 | 1000-13000 | 2000-20000 |
|  | 20-200 | 0.1-1.7 |  |  |

Table 5 shows culturable heterotrophic bacteria, coliform bacteria, *E. coli*, *Vibrio* sp., Enterococci and intestinal Enterococci in influent water, treated test water and control water immediately after treatment and after five days of storage for test cycles 1 and 2, and indicates that required levels were fulfilled.

TABLE 5

|  | Treated water | | Control water | |
| --- | --- | --- | --- | --- |
|  | Day 0 | Day 5 | Day 0 | Day 5 |
| Heterotrophic bacteria (cfu/ml) | | | | |
| Requirement | — | — | — | — |
| Test 1 | $1.7 \pm 0.7 \times 10^2$ |  | $4.6 \pm 0.7 \times 10^5$ |  |
| Test 1 Pre |  | $8.3 \pm 2.7 \times 10^5$ |  | $3.4 \pm 1.5 \times 10^5$ |
| Test 1 Post |  | $1.4 \pm 0.7 \times 10^4$ |  | $2.1 \pm 0.8 \times 10^5$ |
| Test 2 | $6.7 \pm 5.8 \times 10^2$ |  | $4.6 \pm 0.7 \times 10^5$ |  |
| Test 2 Pre |  | $8.9 \pm 1.2 \times 10^5$ |  | $3.4 \pm 1.5 \times 10^5$ |
| Test 2 Post |  | $1.1 \pm 0.5 \times 10^3$ |  | $2.1 \pm 0.8 \times 10^5$ |
| Coliform bacteria (Coli.) and *Escherichia coli*\* (*E. Coli*) (cfu/100 ml) | | | | |
|  | Coli. | Coli. | E. coli | Coli. | Coli. |
| Requirement | — | — | <250* | — | — |
| Test 1 | $0 \pm 0$ |  |  | $>8 \pm - \times 10^2$ |  |
| Test 1 Pre |  | $0 \pm 0$ | $0 \pm 0$* |  | $867 \pm 58$ |
| Test 1 Post |  | $30 \pm 4$ | $0 \pm 0$* |  | $663 \pm 140$ |
| Test 2 | $0 \pm 0$ |  |  | $>8 \pm - \times 10^2$ |  |
| Test 2 Pre |  | $0 \pm 0$ | $0 \pm 0$* |  | $867 \pm 58$ |
| Test 2 Post |  | $1 \pm 1$ | $0 \pm 0$* |  | $663 \pm 140$ |
| *Vibrio* sp. and *Vibrio cholerae*\*\* (cfu/100 ml) | | | | |
|  | *Vibrio* sp. | *Vibrio* sp. | *V. colerae* | *Vibrio* sp. | *Vibrio* sp. |
| Requirement | — | — | <1** | — | — |
| Test 1 | $14 \pm 2$ |  |  | $1.4 \pm 1.3 \times 10^3$ |  |
| Test 1 Pre |  | $4.2 \pm 1.4 \times 10^3$ | $0 \pm 0$** |  | $2.4 \pm 0.1 \times 10^3$ |
| Test 1 Post |  | $1.3 \pm 0.3 \times 10^4$ | $0 \pm 0$** |  | $2.4 \pm 0.5 \times 10^3$ |
| Test 2 | $47 \pm 5$ |  |  | $1.4 \pm 1.3 \times 10^3$ |  |
| Test 2 Pre |  | $3.7 \pm 0.9 \times 10^3$ | $0 \pm 0$** |  | $2.3 \pm 0.4 \times 10^3$ |
| Test 2 Post |  | $63 \pm 45$ | $0 \pm 0$** |  | $2.3 \pm 0.5 \times 10^3$ |
| *Enterococcus group* (Ent. gr.) and Intestinal *Enterococci*\*\*\* (Int Enter.) (cfu/100 ml) | | | | |
|  | Ent. gr. | Ent. gr. | Int Enter. | Ent. gr. | Ent. gr. |
| Requirement | — | — | <100*** | — | — |
| Test 1 | $1 \pm 1$ |  |  | $>8 \pm - \times 10^3$ |  |
| Test 1 Pre |  | $10 \pm 3$ | $10 \pm 3$* |  | $>8 \pm - \times 10^3$ |
| Test 1 Post |  | $127 \pm 40$ | $127 \pm 40$*+ |  | $>8 \pm - \times 10^3$ |
| Test 2 | $2 \pm 2$ |  |  | $>8 \pm - \times 10^3$ |  |
| Test 2 Pre |  | $4 \pm 1$ | $4 \pm 1$* |  | $>8 \pm - \times 10^3$ |
| Test 2 Post |  | $133 \pm 21$ | $133 \pm 21$*+ |  | $>8 \pm - \times 10^3$ |

As shown in Table 5 for the results of Test 1 and Test 2:
(i) heterotropic bacteria in treated water is reduced to $1.4\pm0.7\times10^4$ colony forming units per milliliter (cfu/ml) after Test 1 and to $1.1\pm0.5\times10^3$ cfu/ml after Test 2;
(ii) *vibrio cholerae* in treated water is reduced to 0 cfu/100 ml after Test 1 and to $1.1\pm0.5\times10^3$ cfu/ml after Tests 1 and 2 thereby fulfilling Reg D-2 requirement of less than 1 cfu/100 ml;
(iii) *E. coli* in treated water is reduced to 0 cfu/100 ml after Tests 1 and 2 thereby fulfilling Reg D-2 requirement of less than 250 cfu/100 ml; and
(iv) Coliform bacteria in treated water is reduced to $30\pm4$ cfu/100 ml after Test 1 and to $1\pm1$ cfu/100 ml after Test 2 thereby fulfilling Reg D-2 requirement of less than 100 cfu/100 ml.

Figure 2:
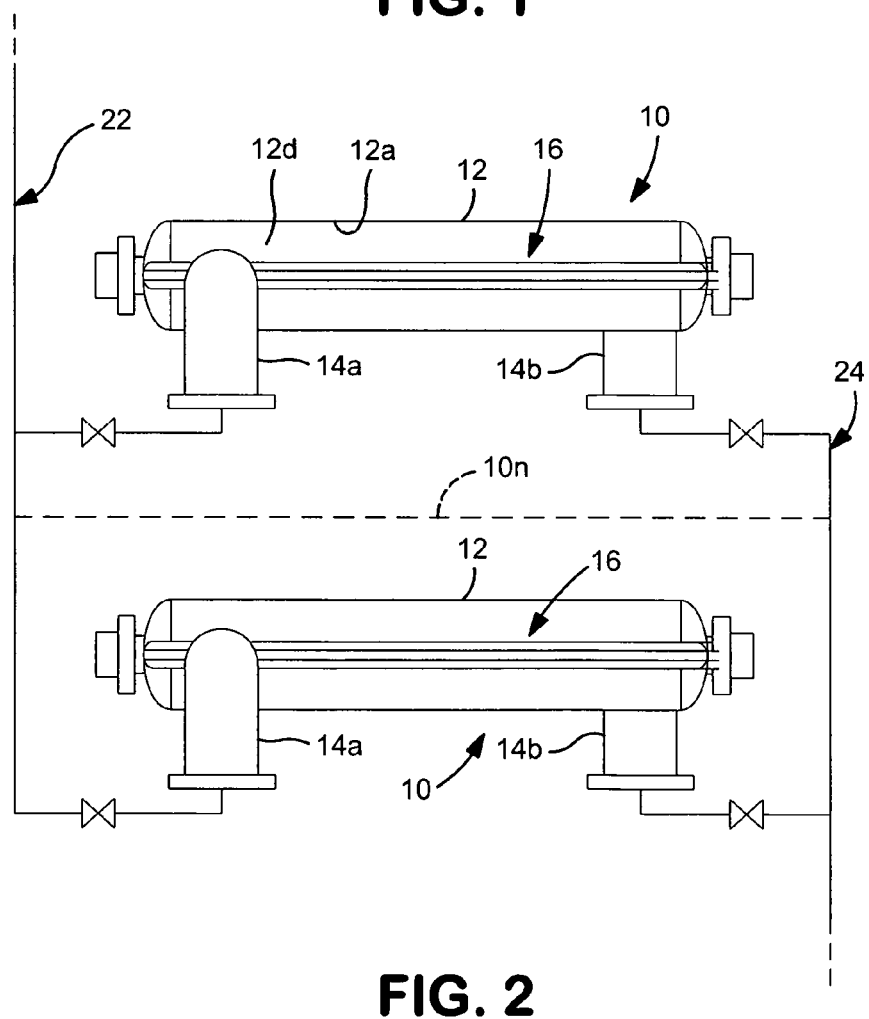
FIG. 2 is a schematic view of the apparatus of FIG. 1 as part of a manifold for using plural reactors in parallel to accommodate full volume of ballast water being treated.

In shipboard installations, as shown in FIG. 2, the reactor 10 according to the invention may be installed with multiple units 10*n* operating in parallel between ballast water lines for influent 22 and discharge flow 24. A single reactor treats about 165 m³/hour and plural reactors may be installed to treat the full ballast water capacity of a ship. It is to be understood that the reactor may be fabricated of 90/10 copper nickel, 70/30 copper nickel, as well as any other grade of commercially available copper nickel.

In accordance with the invention, a method for treating ballast water comprises the following steps:
 a. establishing an enclosed chamber for receiving and discharging a continuing flow of ballast water containing organisms and microbes;
 b. exposing the flow of ballast water to copper nickel;
 exposing the flow of ballast water to ultraviolet radiation at 254 nm to produce biocidal and bactericidal effects on organisms and microbes in the ballast water to reduce:
  (i) organisms in discharge water to less than 10 viable organisms per cubic meter greater than or equal to 50 micrometers in minimum dimension and less than 10 viable organisms per cubic meter less than 50 micrometers in minimum dimension and greater than 10 micrometers in minimum dimension; and, (ii) indicator microbes so as not to exceed:
  .1 Toxicogenic *Vibrio cholerae* (O1 and O139) with less than 1 colony forming unit (cfu) per 100 milliliters or less than 1 cfu per 1 gram (wet weight) zooplankton samples;
  .2 *Escherichia coli* less than 250 cfu per 100 milliliters;
  .3 Intestinal Enterococci less than 100 cfu per 100 milliliters.

Various changes may be made to the equipment arrangements embodying the principles of the invention. The foregoing embodiments are set forth in an illustrative and not in a limiting sense. The scope of the invention is defined by the claims appended hereto.

We claim:

1. An apparatus for ballast water treatment comprising a reactor in the form of a hollow cylinder, the reactor having end caps closing the cylinder to define a watertight reactor chamber having a longitudinal axis, the reactor having a test pressure of 15 bars; the reactor fabricated of copper-nickel alloy, the reactor having inflow and discharge means for ballast water located at opposites ends of the reactor, the ballast water flowing through the reactor having a dwell time of 0.4 seconds in the reactor, each end cap having an end fitting for supporting an end of an ultraviolet lamp, a medium pressure ultraviolet lamp extending through the reactor chamber to emit ultraviolet C range radiation at 254 nanometers into the ballast water, an optically transparent quartz tube extending along said axis between the end fittings and encasing the ultraviolet lamp, a power source cooperating with the end cap fittings for activating the lamp, the power source providing power at 380 to 440 volts, 3 phase, 38 kilowatts and 80 amperes, and the biocidal and bactericidal effect on organisms and microbes entering the reactor with ballast water being sufficient to reduce:
 (i) organisms in discharge water to less than 10 viable organisms per cubic meter greater than or equal to 50 micrometers in minimum dimension and less than 10 viable organisms per cubic meter less than 50 micrometers in minimum dimension and greater than 10 micrometers in minimum dimension;
and to reduce:
 (ii) indicator microbes:
 .1 Toxicogenic Vibrio cholerae (O1 and O139) to less than 1 colony forming unit (cfu) per 100 milliliters or less than 1 cfu per 1 gram (wet weight) zooplankton samples;
 .2 *Escherichia coli* to less than 250 cfu per 100 milliliters;
 .3 Intestinal Enterococci to less than 100 cfu per 100 milliliters.

* * * * *